(12) United States Patent
Charlton et al.

(10) Patent No.: US 8,111,242 B1
(45) Date of Patent: Feb. 7, 2012

(54) ELECTRONIC POINTING DEVICE WITH USER VARIABLE WEIGHT

(75) Inventors: Erik Charlton, Atherton, CA (US); Fergal Corcoran, Co. Cork (IE); Kevin Forde, Cork (IE)

(73) Assignee: Logitech Europe S.A., Romanel-sur-Morges (CH)

( * ) Notice: Subject to any disclaimer, the term of this patent is extended or adjusted under 35 U.S.C. 154(b) by 721 days.

(21) Appl. No.: 11/413,971

(22) Filed: Apr. 28, 2006

Related U.S. Application Data

(60) Provisional application No. 60/676,080, filed on Apr. 28, 2005.

(51) Int. Cl.
G09G 5/08 (2006.01)

(52) U.S. Cl. ........................................................ 345/163

(58) Field of Classification Search .................. 345/156, 345/163, 157
See application file for complete search history.

(56) References Cited

U.S. PATENT DOCUMENTS

| | | | |
|---|---|---|---|
| 4,628,755 A * | 12/1986 | Hawley | 74/471 XY |
| 5,076,584 A | 12/1991 | Openiano | |
| 5,260,696 A | 11/1993 | Maynard, Jr. | |
| 5,416,479 A * | 5/1995 | Jondrow et al. | 341/20 |
| 5,581,277 A * | 12/1996 | Tajiri | 345/163 |
| 5,828,364 A * | 10/1998 | Siddiqui | 345/163 |
| 6,411,281 B1 * | 6/2002 | Sasselli et al. | 345/163 |
| 6,489,947 B2 | 12/2002 | Hesley et al. | |
| 6,590,563 B1 | 7/2003 | Oross et al. | |
| 6,616,108 B1 | 9/2003 | Brophy et al. | |
| 6,859,196 B2 | 2/2005 | Kehlstadt | |
| 7,009,597 B1 * | 3/2006 | Ames | 345/163 |
| 2003/0160765 A1 * | 8/2003 | Gordon | 345/163 |
| 2004/0061681 A1 | 4/2004 | Shen et al. | |
| 2006/0202960 A1 * | 9/2006 | Chang | 345/163 |
| 2006/0202961 A1 * | 9/2006 | Chang | 345/163 |
| 2007/0159461 A1 * | 7/2007 | Zhou | 345/163 |
| 2008/0055250 A1 * | 3/2008 | Chang | 345/163 |
| 2008/0143670 A1 * | 6/2008 | Vayda | 345/156 |

* cited by examiner

*Primary Examiner* — Quan-Zhen Wang
*Assistant Examiner* — Tony Davis
(74) *Attorney, Agent, or Firm* — Kilpatrick Townsend & Stockton LLP

(57) ABSTRACT

An electronic pointing device for a computer comprising a housing and an electronic module to detect the relative displacement over an external surface and transmit it to the computer wherein the housing comprises means to adjust the total weight of the device. According to the invention, the user can freely (within certain limits) adjust the weight depending on his wishes. In one embodiment, the pointing device is a mouse.

15 Claims, 8 Drawing Sheets

ELECTRONIC POINTING DEVICE WITH USER VARIABLE WEIGHT

CROSS-REFERENCES TO RELATED APPLICATIONS

This application claims the benefit of U.S. Provisional Patent Application No. 60/676,080, filed Apr. 28, 2005, entitled "Electronic Pointing Device With User Variable Weight", which is hereby incorporated by reference in its entirety.

BACKGROUND OF THE INVENTION

The present invention concerns the field of electronic pointing devices, in particular autonomous devices which communicate the displacement over a surface to a computer.

The first generation mouse was fitted with a ball from which the lateral displacement of the pointing device, also called mouse, entails the rotation of the ball. This rotation was detected by two sensors which converted the rotation into X,Y displacement. This information was transmitted to the computer through a communication cable or by radio signals.

The second generation of pointing devices uses contactless detection, mostly based on optical sensors, both coherent and non coherent illumination is used. Optical sensing technologies aim at detecting modifications to the reflected optical signal and calculate the X and Y displacements. A contactless mouse means a pointing device of second generation detecting the displacement of the mouse over a surface without physical contact of the detecting elements with said surface.

Various push buttons are added to the mouse to select, validate, browse, i.e. to transmit the user's commands to the computer. The size and shape of the mouse is dictated by the usage, i.e. the adequate gripping by the hand. Various embodiments are proposed for example for right-handed and left-handed people or compact size version for portable computers.

One example of such contactless mouse (i.e. using an optical detection module) is illustrated in the patent U.S. Pat. No. 6,859,196. A typical mouse comprises an electronic module, which is in charge of the movement detection and of the communication with a computer. This electronic module is embedded into a housing from which at least one actuator is apparent.

An example of a mouse where the batteries are placed over the center to put them over the center of gravity of the mouse is found in Logitech U.S. Pat. No. 6,411,281. In the area of game controllers, U.S. Pat. No. 5,076,584 describes a hand-held remote control for a video game with a variable number of removable weights.

Mice are used for a variety of applications, including computer games. PC Gamers express a range of preferences regarding the weight of an optimal gaming mouse. Some claim that a very light weight mouse feels unstable and is difficult to control. Others argue that heavier mice are harder to control because of their inertia. Many of these same users additionally argue that heavier mice can be unnecessary fatiguing when playing for extended periods. Some users also desire a mouse that is well "balanced." Active PC gamers desire a particular hand feel that can be idiosyncratic.

BRIEF SUMMARY OF THE INVENTION

The present invention provides an electronic pointing device for a computer comprising a housing and an electronic module to detect the relative displacement over an external surface and transmit it to the computer wherein the housing comprises means to adjust the total weight of the device. According to the invention, the user can freely (within certain limits) adjust the weight depending on his wishes. In one embodiment, the pointing device is a mouse.

The user can adjust the weight of the mouse by changing a part of the mouse or adding some ballast elements. In one embodiment, a donut shaped weight is inserted into a slot around the optical lens on the bottom case of an optical mouse. Different weights could be used to vary the mouse weight. Alternately, a donut shaped cartridge can be used, with the user controlling the amount of the weight segments inserted, and their position, to both control the weight and the center of gravity of the mouse.

Currently, the weight of existing mice are fixed at manufacturing, and is the same regardless of the user or application. Some users would like a different weight mouse, to give a different feel, depending on the particular user and/or depending on the application the user is using the mouse for. For example, some users may want a different weight mouse to give a desired feel for gaming applications, while others may want a different weight for other applications.

BRIEF DESCRIPTION OF THE DRAWINGS

The invention will be better understood thanks to the attached drawings in which.

DETAILED DESCRIPTION OF THE INVENTION

Figure 1:
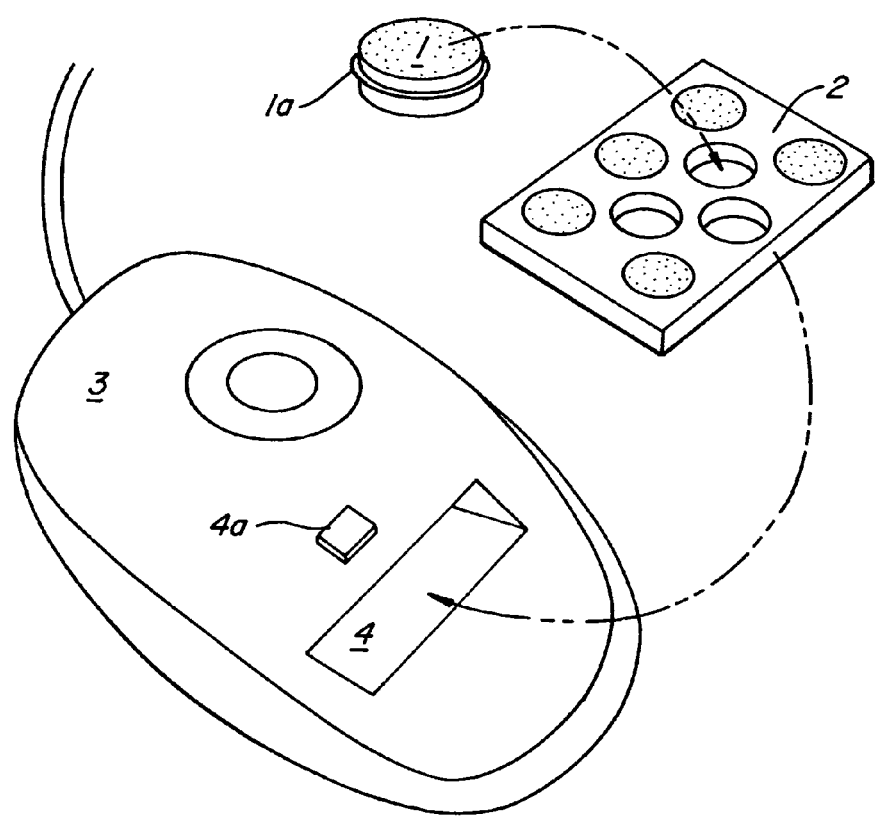
FIG. 1 shows a first embodiment in which the mouse's weight is adjusted using a frame containing individual ballast elements.

According to the first embodiment of the invention, shown in the FIG. 1, the ballast elements 1 are placed in a frame 2. Depending on the user's choice, different ballast weight is used to fill the frame.

Once the frame is filled according to the user's wishes, the same is place in the opening 4 located at the bottom of the mouse. The frame is maintained within the mouse by a suitable actuator 4a acting as a biasing element. To remove the frame, the user simply pushes the actuator 4a and the frame is released.

It is to be noted that the ballast element 1 should not move into the frame. For that purpose, the ballast element comprises a rubber band 1a at its periphery that is adjusted to enter into the corresponding hole of the frame. Once introduced, the ballast element is maintained in this position by the rubber band and can be easily removed by pressure. In an alternative embodiment, the rubber band is placed in the frame's hole so that to produce a biasing effect while entering the ballast element into the frame. In another embodiment, the frame is made out of a smooth elastic material in which the holes are slightly smaller than the diameter of the ballast element. The user can press the ballast element into the frame and the elastic characteristic of the frame's material maintains the ballast element into said frame.

The fact that the frame 2 has many holes or housings allows the user to determine the spatial repartition of the weights. It is then possible to put some elements in the front or in the back of the frame, thus allowing different mouse's behavior. The different configurations allow changing the location of the center of gravity.

Figure 2:
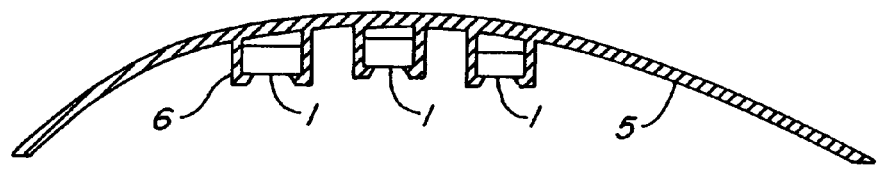
FIG. 2 shows a second embodiment in which the ballast elements are mounted directly on the back of the mouse's cover.
Figure 3:
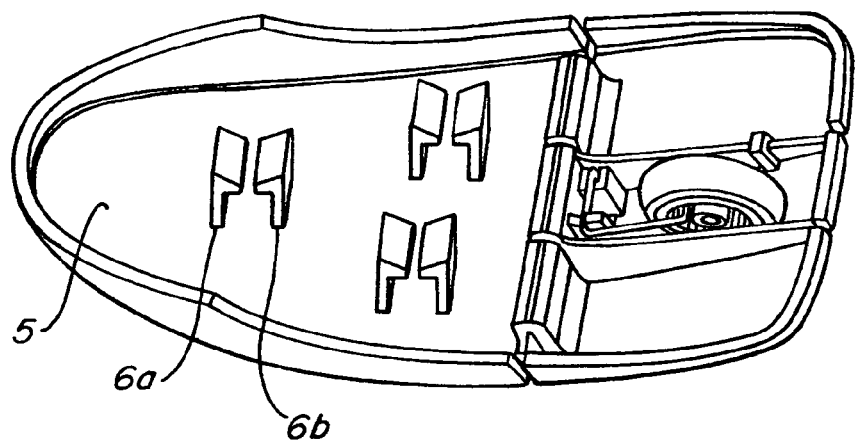
FIG. 3 shows the second embodiment from another view.

The second embodiment is illustrated in the FIGS. 2 and 3. The mouse comprises a removable cover 5 which can be removed by the user. The back part of the cover comprises mounting elements 6, 6a and 6b, which can receive ballast elements as shown in the FIG. 1.

The user can individually put the ballast elements into the mounting elements, select the weight of these elements according the desired mouse behavior. Not only is the weight selected by the user but also the position in the cover. This allows various configurations and balances of the mouse.

Other mounting means are possible, e.g. using a screw. The common point to these mounting means is to allow the user to firstly select the desired weight and secondly to put it on the back of the cover in the desired location. It is worth noting that the ballast element can have various shapes such as rectangular, cylindrical or non-geometric form.

Figure 4:
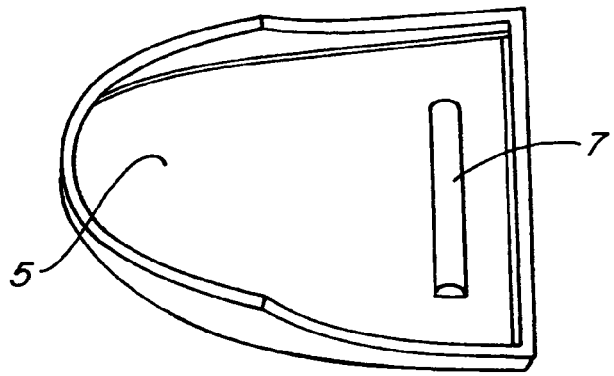
FIGS. 4 and 5 show a third embodiment in which the cover has molded ballast elements.
Figure 5:
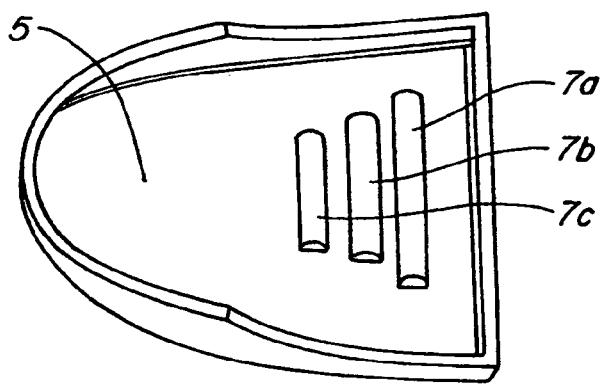

According to a third embodiment shown in the FIGS. 4 and 5, the cover contains ballast elements 7, 7a, 7b, 7c, which are molded directly in the cover. To change the total weight of the mouse, different covers are proposed, each having a different weight. The user chooses the appropriate cover and uses it to complete the mouse. In order to better identify the weight of each cover, this latter is made in different color, each color representing a specific weight.

The FIGS. 4 and 5 show an interchangeable cover although other pieces of the mouse can serve to adjust the weight. It is then possible to use an interchangeable part on the bottom or on the side of the mouse.

Figure 6:
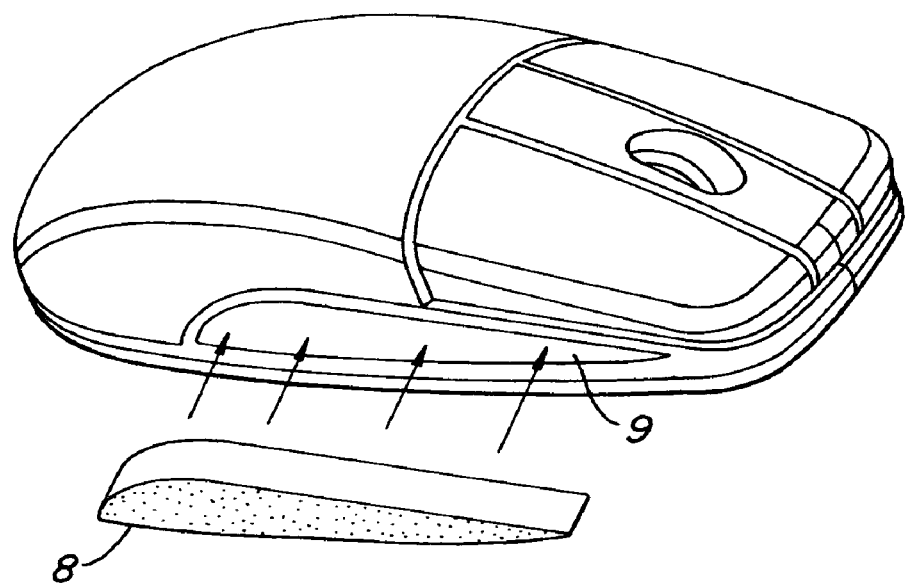
FIG. 6 shows a fourth embodiment in which the ballast is a decorative element.

This is the fourth embodiment shown in the FIG. 6. A decorative element 8 is used to adjust the mouse's weight. In order to keep the center of gravity in the middle of the mouse, it is preferable to have the same interchangeable decorative element on both side of the mouse.

The user receives with its mouse several decorative elements, each having a different weight. After selecting the appropriate one, the same is placed in the corresponding recess 9. Suitable attachments are provided to allow the user to place or remove the decorative element at will.

Figure 8:
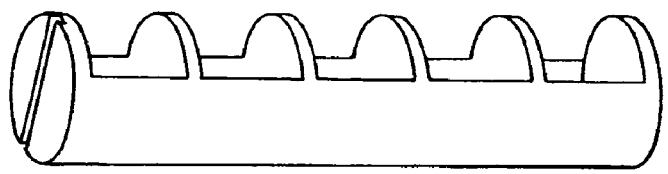
FIG. 8 shows a frame having the form of a tube to receive the ballast elements.

The decorative element can be in the form of a tube, illustrated in the FIG. 8, which is inserted in the mouse. This tube can go through the mouse and be visible on the opposite side to permit the user an easy removal of the tube by exerting a pressure on the end portion of the tube. This tube comprises several compartments which receive the individual ballast elements. These elements can have the form as illustrated in the FIG. 1. After having chosen the desired weight and center of gravity, the tube is inserted in the mouse and fastened inside e.g. like a screw.

Figure 7:
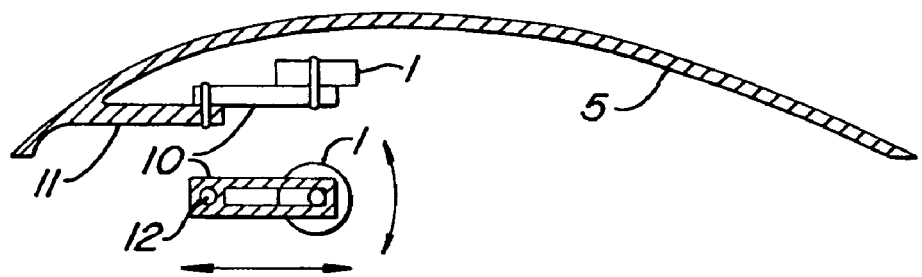
FIG. 7 shows a support for the ballast element, said support being movable within the mouse interior.

According to a fifth embodiment illustrated in the FIG. 7, the ballast element 1 is placed on a slider arm 10. After having selected to appropriate weight, the user can mount the ballast element on this arm 10. This latter comprises a groove allowing the weight to be positioned along the arm at the desired position. The slider arm 10 is mounted onto a rigid arm 11 extending from the cover 5. The slider arm can be freely moved thanks to the pivot hinge 12 linking said slider arm 10 and the rigid arm 11.

These different movable parts allow the user to spatially locate the weight so as to obtain the desired position of the center of gravity.

Another embodiment not illustrated is an alternative solution of the first embodiment. Once the cover has been removed, the frame is visible and is part of the mouse structure. The user can put the desired weight or ballast element on the frame and replace the cover. On the top of the cover, a biasing element such as foam creates a pressure on each ballast element to avoid any noise or movement in the frame.

Donut Concept

Figure 9A:
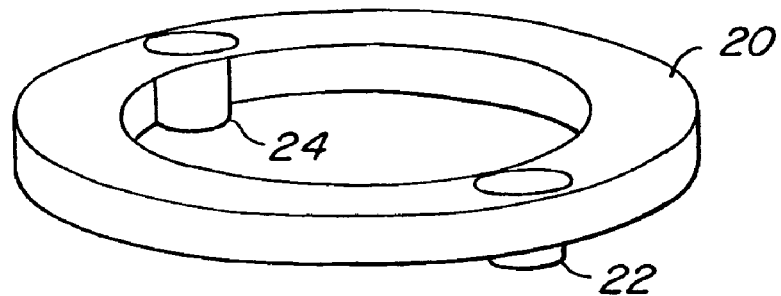
FIGS. 9A-C illustrate a variety of donut shaped weights according to one embodiment of the invention.
Figure 9B:
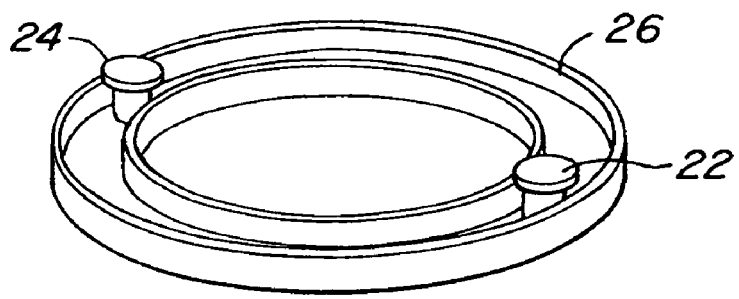
Figure 9C:
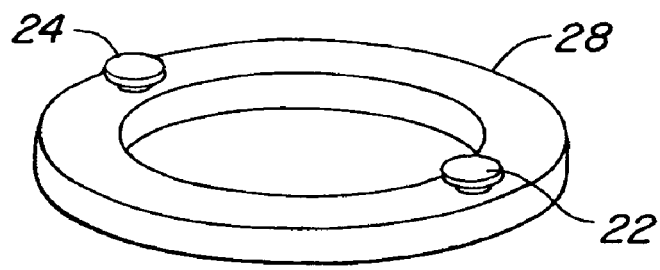

In one embodiment, a hollowed out area in the bottom of a mouse holds a donut (disc) shaped weight placed around the optical lens of a mouse. This allows easy adjustment, without requiring the user to open up the mouse. The weights can take a variety of forms as shown in FIGS. 9A-C. FIG. 9A shows a weight 20 with a pair of pins 22, 24 for attaching it to the bottom of a mouse. The weight can be made of any material, such as lead, steel, bismuth, tin, tungsten, brass, aluminum, glass, ceramic, polymer/metal composites, thermoplastics and granite. A 15 gram weight is shown. Alternately, a 38 gram weight can be provided. A variety of different weights of the same shape can be provided for the user to select from. By keeping the choice to two, the selection is simpler for the user. However, a variety of weight could be used, with different materials or different amounts of material in a housing to vary the weight. FIG. 9B illustrates a hollowed out steel weight 26. FIG. 9C illustrates a solid steel weight 28, which would be heavier than the hollowed out weight 26.

Figure 10A:
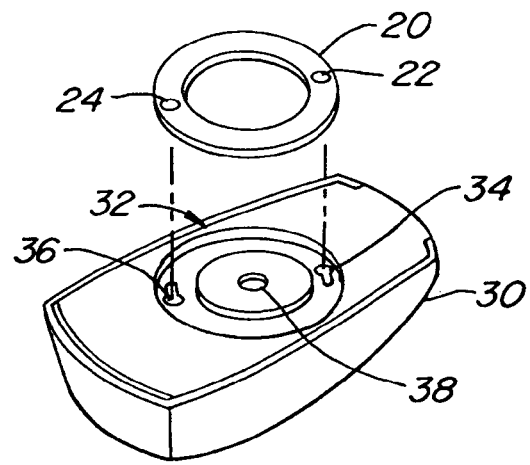
FIGS. 10A-C illustrate a round trench in a mouse and demonstrate the insertion of a donut shaped weight according to one embodiment of the invention.

FIG. 10A shows a mouse 30 which receives a weight 20 in a circular groove 32. The pins 22, 24 engage rounded holes 34, 36, and then rotate to the narrow part of holes 34, 36 to hold the weight in place A lens 38 for an optical sensor is usually centered in the mouse. This is where the ideal center of gravity is also located. This donut system allows the weight to be added at this point of ideal center of gravity. A foam pad or spring can be added to remove rattle and to provide pressure to hold the weight in position.

Figure 10B:
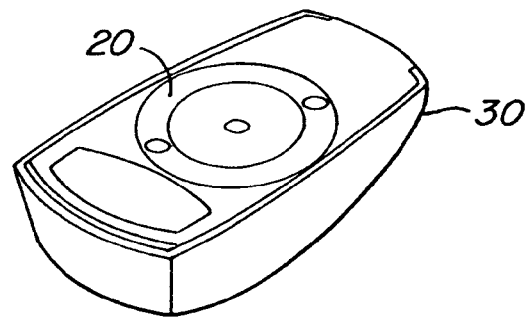

FIG. 10B illustrates weight 20 after it has been inserted in mouse 30 and rotated to secure it. As can be seen, it is flush with the bottom of the mouse so movement isn't impeded. In one embodiment, the exposed surface of the weight and/or the pins are coated with Polytetrafluoroethylene or other material which enhances the sliding of the mouse along a surface.

Figure 10C:
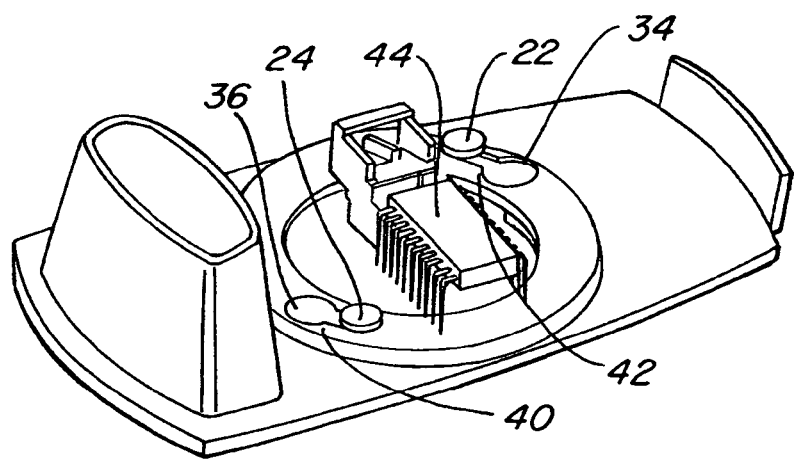

FIG. 10C illustrates the inside of the mouse housing with the weight attached. The holes 34, 36 include a pair of pips 42, 40 to keep the pins 22, 24 in place. Also shown is a chip 44 with the optical sensor.

Donut Cartridge with Individual Weights

Figure 11A:
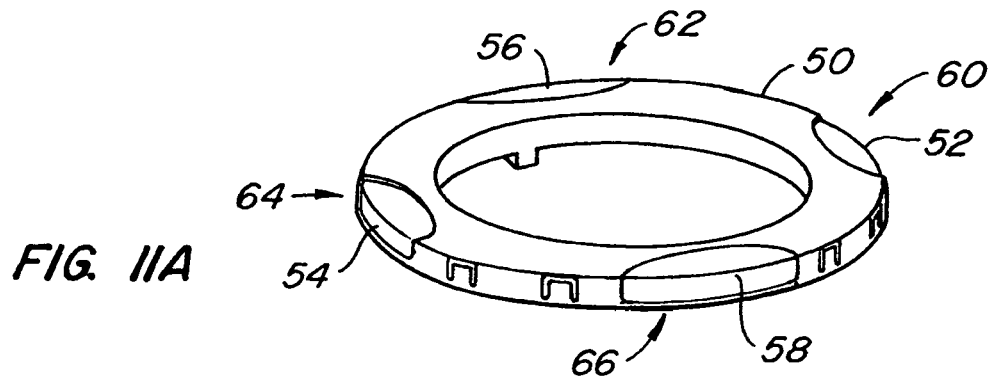
FIGS. 11A-B show a weight cartridge which holds individual weights according to one embodiment of the invention.
Figure 11B:
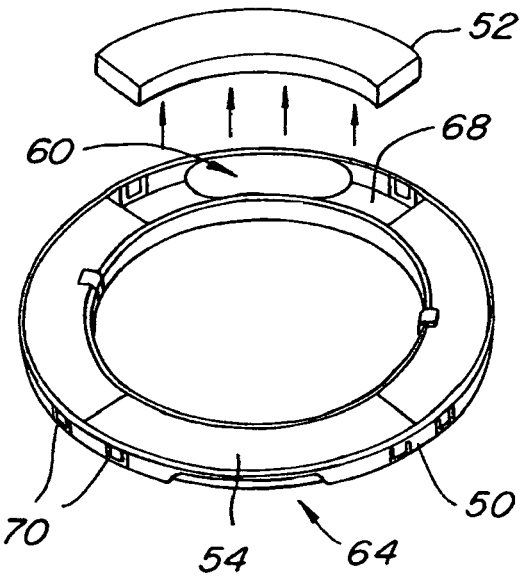

FIGS. 11A-B show a weight cartridge, made from metal or plastic, which holds individual weights. These individual weights can be cylinders or segments, as shown. FIG. 11A shows a cartridge 50 with weights 52, 54, 56 and 58 which are partially exposed through slots 60, 62, 64 and 66. The side shown would be the exposed side when mounted in the bottom of the mouse, with a smooth surface to avoid inhibiting sliding of the mouse.

FIG. 11B shows the other side, illustrating how a weight 52 can be inserted into a cavity 68. The slot 60 allows the user to push the weight out from the other side. In one embodiment, cartridge 50 is made of sheet metal. Springs 70 hold the weight segments in position.

Tunable Weight

The segments can be removed individually to adjust the overall weight. Segments made from materials of different density can be fitted to vary the weight further. For example light aluminum or heavy brass weight segments could be used.

Tunable Balance

The weight segments can be inserted anywhere on the disc (0-360° range) allowing the position of the centre of gravity to be adjusted. For example: if only one single segment is added it can be placed on the far left. This affects the centre of gravity of the mouse differently than if the single segment was placed on the far right.

Figure 12A:
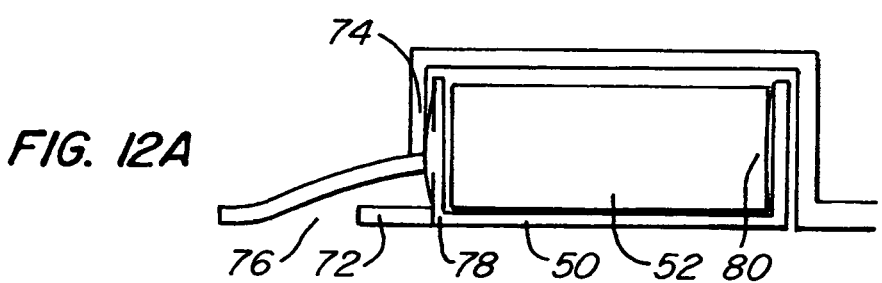
FIGS. 12A-F illustrate different embodiments of structures to retain and allow easy removal of the weight segments.

FIGS. 12A-F illustrate different embodiments of structures to retain and allow easy removal of the weight segments. FIG. 12A shows a side view of one of the weights 52 mounted in cartridge or tray 50, and inserted into the bottom case 72 of a mouse. Springs 74 and 80 are formed in the metal tray to hold the weight segment 52 in place. A thumb groove 76 provides user access to release the tray, which can be press fitted into the bottom case, or the bottom case can have a spring or other mechanism to retain the tray. A finger opening 78 allows removal of the weights.

Figure 12B:
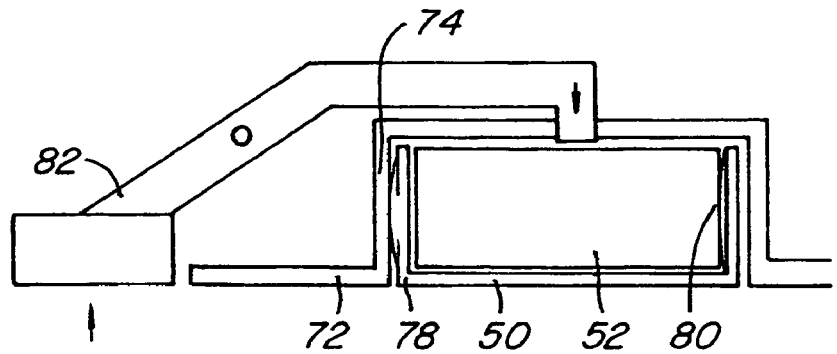

FIG. 12B illustrates a variation of the embodiment of FIG. 12A, with a weight tray ejector lever 82 being provided to aid in removing the weight tray.

Figure 12C:
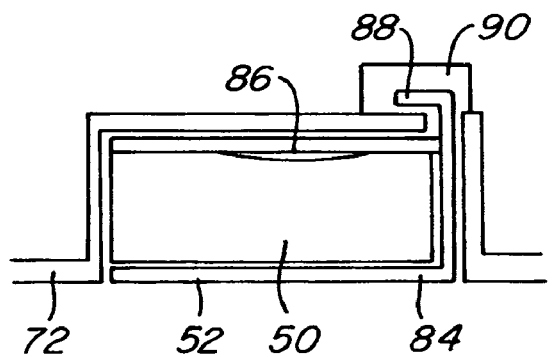

FIG. 12C illustrates another embodiment with a finger opening 84 to remove weights and a structure 88 to affix the tray to the mouse, which is similar to the removable plastic structure used to retain a mouse ball in old ball mice. A heat sealed membrane 90 is provided for ESD (Electro-Static Discharge) protection. A spring 86 is mounted in a different location that the other embodiments, on the top of the tray.

Figure 12D:
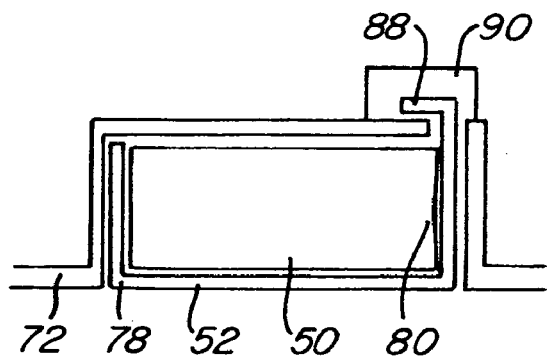
Figure 12E:
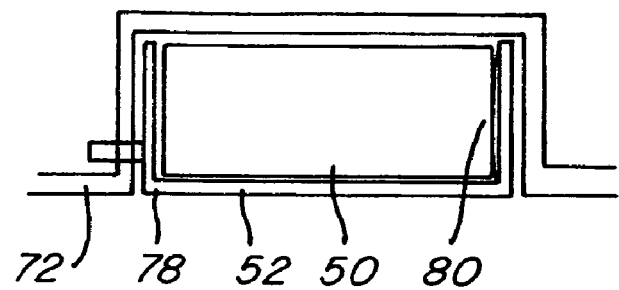
Figure 12F:
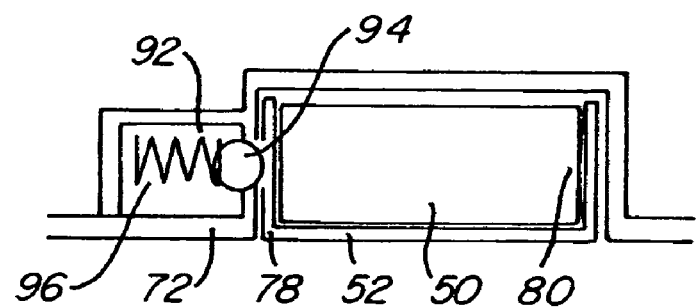

FIG. 12D illustrates a variation of the embodiment of FIG. 12C, with a spring 80 mounted on a side of the tray. FIG. 12E shows a similar embodiment without the ball door type fixing system. FIG. 12F substitutes a button release mechanism 92 with a ball or pin 94 on the end of a spring 96.

As will be understood by those of skill in the art, the present invention could be embodied in other specific forms without departing from the essential characteristics thereof. For example, the weight can be another shape which will fit around the optical lens, such as oval or rectangular. The weights could be added to a gamepad or other movable controller. The controller can control a computer, a video game console, or any other electronic appliance. Accordingly, the foregoing description is intended to be illustrative, but not limiting, of the scope of the invention, which is set forth in the following claims.

What is claimed is:

1. An electronic pointing device to control operation of an electronic appliance comprising:
   a housing;
   an electronic module to detect and transmit the relative movement of said device;
   a recess in said housing accessible from the exterior of said housing;
   a removable frame shaped to fit in said recess, said frame having a plurality of openings, which opens toward the recess with the removable frame inserted in the recess, for holding a plurality of weights; and
   at least one weight for insertion into said frame, said weight only functioning as a weight.

2. The pointing device of claim 1 further comprising:
   a plurality of removable weights for insertion into said openings in said frame;
   wherein at least two of said weights weigh different amounts.

3. The pointing device of claim 1 wherein:
   each of said removable weights having an identical size and shape; and
   said openings in said frame being horizontally separated, such that a user can vary the location and amount of added weights in said frame to vary the center of gravity of said frame.

4. The pointing device of claim 1 further comprising:
   an actuator for releasing said frame from said recess.

5. The pointing device of claim 1 wherein said pointing device is a mouse, and further comprising:
   an optical sensor for sensing movement of said mouse.

6. An electronic pointing device to control operation of an electronic appliance comprising:
   a housing;
   an electronic module to detect and transmit the relative movement of said device;
   a recess in said housing accessible from the exterior of said housing;
   a removable frame shaped to fit in said recess, said frame having a plurality of openings for holding a plurality of weights, wherein the plurality of openings opens toward the recess with the removable frame inserted in the recess;
   a plurality of removable weights for insertion into said openings in said frame, said weights only functioning as weights;
   wherein at least two of said weights weigh different amounts;
   wherein each of said removable weights have an identical size and shape.

7. The pointing device of claim 6 wherein said pointing device is a mouse, and further comprising:
   an optical sensor for sensing movement of said mouse.

8. The pointing device of claim 6 further comprising a plurality of removable weights for insertion into said openings in said frame.

9. The pointing device of claim 8 wherein said openings in said frame are horizontally separated, such that a user can vary the location and amount of added weights in said frame to vary the center of gravity of said frame.

10. The pointing device of claim 8 wherein each of said removable weights has an identical size and shape.

11. The pointing device of claim 10 wherein said openings in said frame are horizontally separated, such that a user can vary the location and amount of added weights in said frame to vary the center of gravity of said frame.

12. The pointing device of claim 6 wherein said openings in said frame are horizontally separated, such that a user can vary the location and amount of added weights in said frame to vary the center of gravity of said frame.

13. The pointing device of claim 12 further comprising an actuator for releasing said frame from said recess.

14. The pointing device of claim 6 further comprising an actuator for releasing said frame from said recess.

15. The pointing device of claim 14 wherein said pointing device is a mouse, and further comprises an optical sensor for sensing movement of said mouse.

* * * * *